No. 628,216. Patented July 4, 1899.
R. TAYLOR, Jr.
TRAVELING FLAT CARDING ENGINE.
(Application filed Apr. 25, 1899.)
(No Model.)
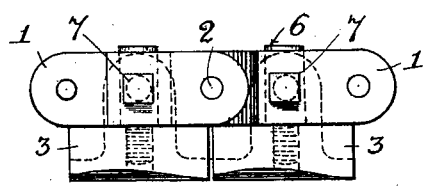
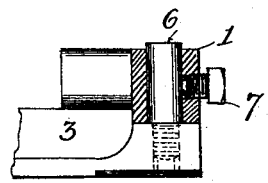
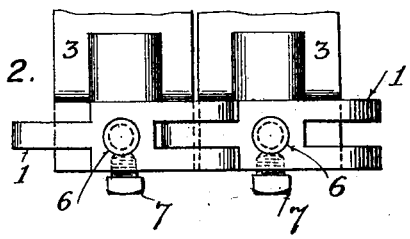
WITNESSES:
INVENTOR
Robert Taylor Junior
BY
Richardson
ATTORNEYS

UNITED STATES PATENT OFFICE.

ROBERT TAYLOR, JR., OF OLDHAM, ENGLAND.

TRAVELING-FLAT CARDING-ENGINE.

SPECIFICATION forming part of Letters Patent No. 628,216, dated July 4, 1899.

Original application filed January 4, 1899, Serial No. 701,144. Divided and this application filed April 25, 1899. Serial No. 714,440. (No model.)

*To all whom it may concern:*

Be it known that I, ROBERT TAYLOR, Jr., a subject of the Queen of Great Britain, residing at Oldham, in the county of Lancaster, England, have invented certain new and useful Improvements in Traveling-Flat Carding-Engines, (for which I have made application for Letters Patent in Great Britain, No. 14,750, bearing date July 5, 1898,) of which the following is a specification.

This application is a division of application, Serial No. 701,144, filed by me for Letters Patent of the United States on January 4, 1899.

My invention relates to improvements in traveling-flat carding-engines; and the object of my improvements is to enable any flat to be disconnected from the traveling chains without disturbing or displacing the latter.

In the ordinary way each flat is pivoted at each end upon one of the pins which pass through the bushes which connect together the links of the chain; but according to my improvements I separately pivot or connect each flat to the links of the chains in such a way that a flat can be readily disconnected from or attached to the chains without interfering with the pins which hinge the links together.

In the accompanying sheet of drawings, Figure 1 is a side elevation, Fig. 2 a plan, and Fig. 3 a transverse section, of part of one of the chains and flats of a traveling-flat carding-engine to which my improvements are applied.

In the drawings, 1 denotes the links of the traveling chain, 2 the pins which pivot the links together, and 3 the traveling flats.

In the construction illustrated a vertical stud 6 is screwed or otherwise fixed at each end of each flat and enters a vertical hole formed to receive it in its link 1 of the chain, where it is locked by a pinching-screw 7. To disconnect any flat, it is only necessary to slacken the pinching-screws 7 at each end of the flat, when the flat can be removed from the chains without disturbing or displacing the chains or the other flats.

Having now particularly described and ascertained the nature of my said invention and in what manner the same is to be performed, what I claim, and desire to secure by Letters Patent of the United States, is—

In a carding-engine the combination with the traveling chains, of the vertical studs 6 fixed at the ends of the flats and adapted to pass through vertical holes in the links of the chains substantially as herein set forth.

In witness whereof I have hereunto set my hand in presence of two witnesses.

ROBERT TAYLOR, JR.

Witnesses:
 H. B. BARLOW,
 HERBERT R. ABBEY.